United States Patent
Zhan et al.

(10) Patent No.: US 9,252,928 B2
(45) Date of Patent: Feb. 2, 2016

(54) ULTRA-WIDEBAND LOSS OF SIGNAL DETECTOR AT A RECEIVER IN A HIGH SPEED SERIALIZER/DESERIALIZER (SERDES) APPLICATION

(71) Applicant: LSI Corporation, San Jose, CA (US)

(72) Inventors: Sanyi Zhan, Shanghai (CN); Tainwei Liu, Shanghai (CN); Erzhu Chen, Shanghai (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 43 days.

(21) Appl. No.: 13/775,501

(22) Filed: Feb. 25, 2013

(65) Prior Publication Data
US 2014/0192841 A1    Jul. 10, 2014

(30) Foreign Application Priority Data
Jan. 9, 2013   (CN) .......................... 2013 1 0007189

(51) Int. Cl.
*H04B 1/00* (2006.01)
*H04L 1/20* (2006.01)
*G06F 11/10* (2006.01)

(52) U.S. Cl.
CPC . *H04L 1/20* (2013.01); *G06F 11/10* (2013.01)

(58) Field of Classification Search
CPC ................ H01L 2924/00; H01L 2224/48227; H01L 2224/73265
See application file for complete search history.

(56) References Cited

U.S. PATENT DOCUMENTS

| | | | |
|---|---|---|---|
| 4,868,470 A | 9/1989 | Bucska et al. | 318/561 |
| 6,377,082 B1 | 4/2002 | Loinaz et al. | 327/20 |
| 6,438,178 B1 * | 8/2002 | Lysdal et al. | 375/317 |
| 6,819,880 B2 | 11/2004 | Yoshikoshi | 398/202 |
| 7,102,392 B2 | 9/2006 | Hsu et al. | 327/20 |
| 7,174,106 B2 | 2/2007 | Weber | 398/135 |
| 7,263,151 B2 | 8/2007 | Momtaz et al. | 375/371 |
| 7,620,317 B2 | 11/2009 | Stewart et al. | 398/22 |
| 7,694,059 B2 | 4/2010 | Sobelman | 710/305 |
| 8,068,559 B1 | 11/2011 | Butcher | 375/316 |
| 2005/0147185 A1 * | 7/2005 | Fratti | H03G 7/001 375/316 |
| 2005/0213982 A1 * | 9/2005 | Weber | 398/135 |
| 2010/0119228 A1 * | 5/2010 | Zhou et al. | 398/66 |

* cited by examiner

*Primary Examiner* — Shuwang Liu
*Assistant Examiner* — Gina McKie

(57) ABSTRACT

An apparatus comprising a first loss of signal circuit, a second loss of a signal circuit and a gate circuit. The first loss of a signal circuit may be configured to (i) receive an input signal containing a series of data and (ii) generate a first indication signal when the input signal is operating within a first frequency range. The second loss of signal circuit may be configured to (i) receive the input signal and (ii) generate a second indication signal when the input signal is operating within a second frequency range. The gate circuit may be configured to generate an output signal in response to either the first indication signal or the second indication signal being active.

20 Claims, 7 Drawing Sheets

ULTRA-WIDEBAND LOSS OF SIGNAL DETECTOR AT A RECEIVER IN A HIGH SPEED SERIALIZER/DESERIALIZER (SERDES) APPLICATION

FIELD OF THE INVENTION

The present invention relates to data transmission generally and, more particularly, to a method and/or apparatus for implementing an ultra-wideband loss of signal detector at a receiver in a high speed SERDES application.

BACKGROUND OF THE INVENTION

Conventional serializer and deserializer circuits (SERDES) are often used to transmit high speed parallel data across a lossy channel. For a set of high speed parallel data, the timing or synchronization is difficult to achieve when the set of data is sent out through different paths.

For this reason, the parallel data can be first converted into serial data in a transmitter. Then the transmitter will send out the serial data with a certain amplitude to a remote receiver across a lossy channel. The receiver then amplifies the attenuated input signal. The amplified signal is sampled by a clean clock to remove noise. The phase of the received signal is aligned to a well defined clock phase. The received serial signal is then converted back to a parallel digital signal. The channel is usually built by transmission lines in a printed circuit board. With higher data rates and longer channels, the loss is large.

Conventional approaches often implement a pre-emphasis circuit in the transmitter and a linear equalizer and decision feedback equalizer (DFE) in the receiver. The pre-emphasis and equalization circuits are built in the SERDES to remove inter-symbol interference (ISI).

The equalization circuits implemented in receivers tend to use a lot of power. If there are no real data received in the receivers, the equalization circuit can be powered down in order to save power, which needs a circuit to determine the effectiveness of the received signal. In general, a circuit with this function is called loss of signal detector (LOS). Conventional approaches implement a loss of signal detector at a receiver to continuously monitor the channel data and the link status. If the output of the loss of signal detector is high (or effective), an indication is sent that the channel data is lost or the received data is too small to power up the other signal processing circuit in the receiver.

A loss of signal detector includes a linear amplifier to amplify the received data, a rectifier to convert the amplified AC signal to DC voltage, a comparator to compare the rectified DC voltage with a reference voltage. The output of the comparator is sent to the digital control core of the SERDES. For data communication, the data rate processed by a SERDES is increased from a few Gbps up to 30 Gbps. Data rates tend to continuously increase as designs evolve.

To enable the loss of signal circuit to differentiate significantly attenuated data from noise is challenging. With the progress of CMOS technology, supply voltages tend to scale down, but the data rates tend to increase. The attenuation across a circuit board proportionally decreases the data rate. The overall effect is that with a smaller feature size, a lower supply voltage, a faster operating speed and a larger attenuation, the signal amplitude at the far end of a remote receiver decreases. The signal to noise ratio (SNR) also decreases. Therefore, the sensitivity of a LOS circuit has to increase.

Since the received data could be in any frequency range (from 100 Mbps up to 30 Gbps), LOS circuits need to maintain an ultra wide bandwidth.

U.S. Pat. No. 6,377,082, entitled "Loss-of-Signal Detector for Clock Data Recovery Circuit", discloses using clock and data recovery (CDR) circuit to detect the loss of signal. One drawback with such an approach is the reliance on the function of the CDR decision circuit. The pre-requirement for the functionality of a CDR decision circuit is that the input signal amplitude has to be large enough. Such an approach is power hungry since most of the blocks in receiver need to be powered on.

U.S. Pat. No. 4,868,470, entitled "Apparatus and Method for Detecting a True Average of N Signal Samples", discloses an average detector in bipolar technology, which uses an input capacitor C, an output capacitor nC, and a number of diodes. Such an architecture can not be applied in low voltage CMOS process.

U.S. Pat. No. 7,102,392, entitled "Signal Detector for High-Speed SerDes", discloses an improved signal detector by using two peaking amplifiers to amplify simultaneously the differential received signals and differential reference voltages. The major drawback is that such an approach consumes large amounts of power due to the power consumption of the peaking amplifier. Another issue is that the gain for the reference voltage from a peaking amplifier is a DC gain. The gain for input signal is a large-signal AC gain. The gain from these two peaking amplifiers can not be accurately matched.

It would be desirable to implement an ultra-wideband loss of signal detector that may be used at a receiver for high speed SERDES application.

SUMMARY OF THE INVENTION

The present invention concerns an apparatus comprising a first loss of signal circuit, a second loss of signal circuit and a gate circuit. The first loss of a signal circuit may be configured to (i) receive an input signal containing a series of data and (ii) generate a first indication signal when the input signal is operating within a first frequency range. The second loss of signal circuit may be configured to (i) receive the input signal and (ii) generate a second indication signal when the input signal is operating within a second frequency range. The gate circuit may be configured to generate an output signal in response to either the first indication signal or the second indication signal being active. In one example, three or more loss of signal circuits may be implemented.

The features and advantages of the present invention include providing a signal detector that may (i) detect signal loss at a receiver, (ii) operate in an ultra-wideband range, (iii) operate with a SERDES, (iv) implement multiple RXLOS circuits in parallel, (v) optimize each sub RXLOS block for a certain input frequency range, (vi) determine the final RXLOS digital output based on the outputs of individual RXLOS block, and/or (v) be easy to implement.

BRIEF DESCRIPTION OF THE DRAWINGS

These and other features and advantages of the present invention will be apparent from the following detailed description and the appended claims and drawings in which:

DETAILED DESCRIPTION OF THE PREFERRED EMBODIMENTS

Example embodiments of the present invention generally relate to a CMOS signal detector that may be used in a high speed data link to indicate the presence and/or absence of data on a receive channel. Embodiments of the present invention may implement a loss of signal detector in a high-speed SERDES receiver core that may determine the effectiveness of data received over an ultra-wide bandwidth range.

Figure 1:
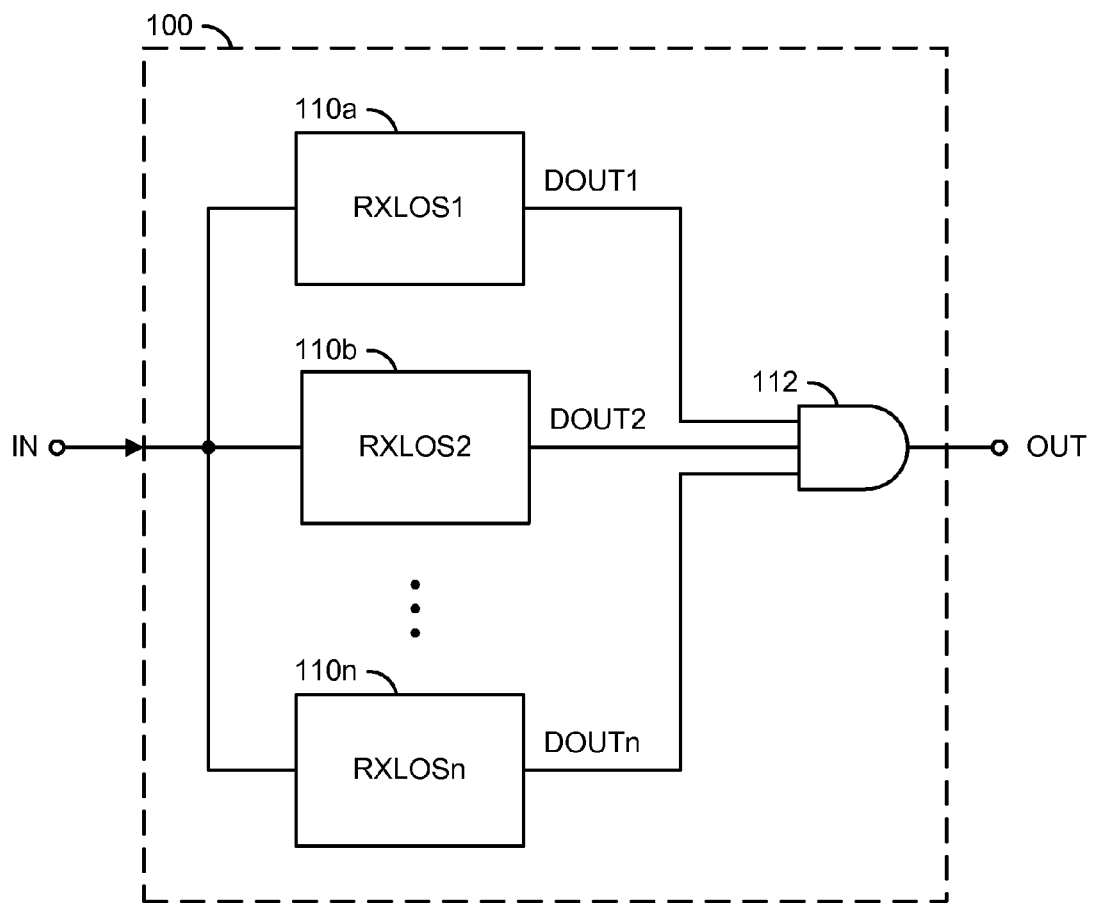
FIG. 1 is a block diagram of an embodiment of the present invention.

Referring to FIG. 1, a block diagram of a circuit 100 is shown in accordance with an embodiment of the present invention. The circuit 100 generally comprises a number of blocks (or circuits) 110a-110n and a block (or circuit) 112. The circuits 110a-110n may be implemented as receive/loss circuits. The circuit 112 may be implemented as a gate, such as a logical AND gate. The circuit 100 may receive a signal (e.g., IN) and present a signal (e.g., OUT). The signal IN may represent an input signal. The signal IN may be an input signal that may contain a series of data. The data contained in the signal IN may operate at various frequencies. The signal OUT may represent an output signal.

Each of the circuits 110a-110n may receive the signal IN. The circuit 110a may present a signal (e.g., DOUT1), the circuit 110b may present a signal (e.g., DOUT2), and the signal 110n may present a signal (e.g., DOUTn). The circuit 112 may determine if one or more of the circuits 110a-110n present a corresponding one of the output signals DOUT1, DOUT2, DOUTn, etc. The signal OUT may represent a composite output that indicates when one or more of the circuits 110a-110n have detected a signal present at a particular frequency range. For example, if any one of the circuits 110a-110n detects data, then the signal OUT normally indicates data is present. The circuits 110a-110n may be each optimized (or calibrated) to detect activity on the signal IN at a particular frequency range.

The circuit 100 generally includes n (e.g., an integer greater than one) sub-RXLOS circuits 110a-110n, generally operating in parallel. The particular number of circuits 110a-110n implemented may be varied to meet the design criteria of a particular implementation. For example, one of the RXLOS circuits 110a-110n may be designed to detect data having rates from around 100 Mbps to 4 Gbps. Another one of the circuits 110a-110n may be designed to detect data having a rate from 3 Gbps to 8 Gbps. Another one of the circuits 110a-110n may be designed to detect data having the highest input data rate, for example above 8 Gbps. If any one of the circuits 110a-110n indicates that the input signal is effective (e.g., present), the final digital output would be effective (e.g., present). With such a multi-detector approach, an ultra-wideband RXLOS may be implemented.

With current techniques, the design of a one loss of signal circuit having an ultra wide bandwidth (e.g., from 100 Mbps up to 30 Gbps) is almost impossible. However, the circuit 100 provides a design with a number of individual RXLOS circuits 110a-110n, each operating within a certain bandwidth (e.g., from 100 Mbps to 2 Gbps, from 6 Gbps to 10 Gbps, etc.).

To further reduce the power consumption for low frequency band operation (e.g., from 100 Mbps to 2 Gbps), the design of the circuit 100 may be simplified so that power may be minimized. To further save the silicon area, if the circuit 100 is applied to a higher frequency range, capacitors in a rectifier block (to be discussed in more detail in connection with FIG. 2 and FIG. 3) may be minimized. In this way, the overall design may be optimized within a reasonable area and/or power consumption target. The general detected bandwidth of the circuit 100 may be extended to cover ranges up to 100 Mbps to 30 Gbps, or more.

Figure 2:
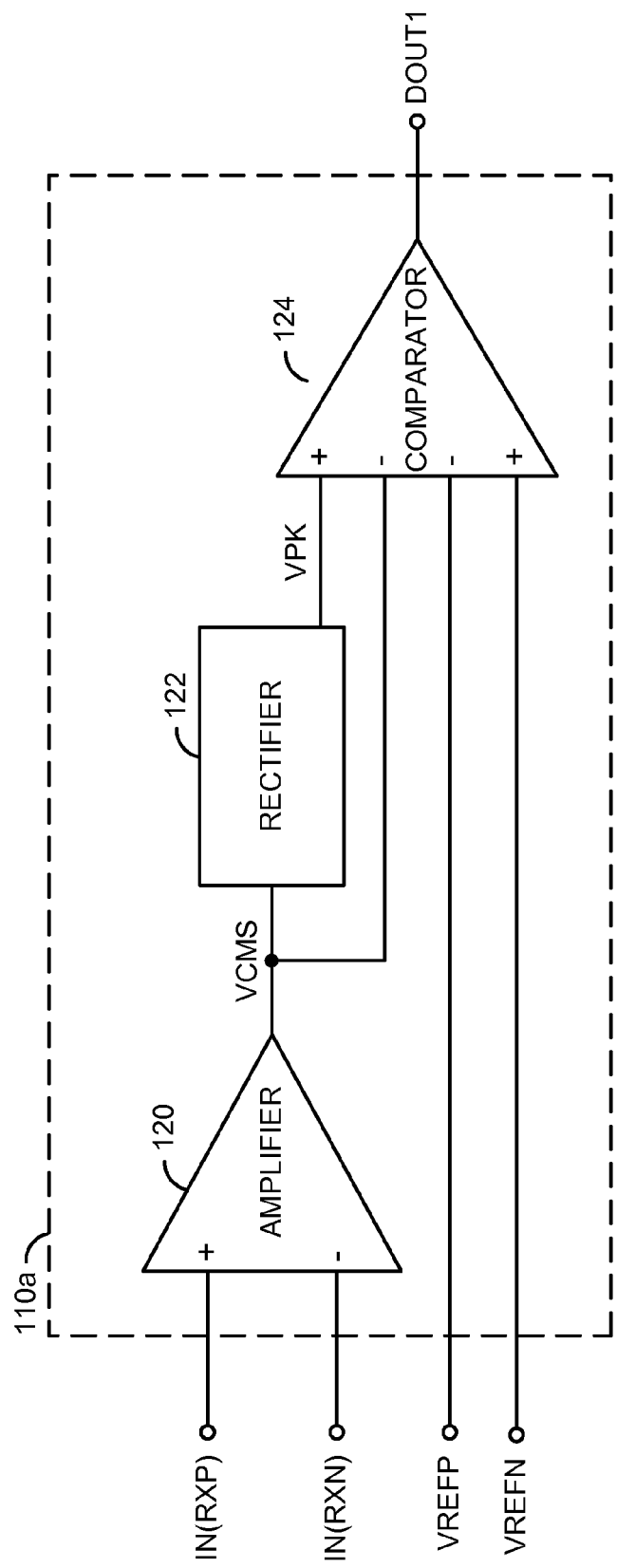
FIG. 2 is a block diagram of an individual circuit of FIG. 1.

Referring to FIG. 2, a block diagram of one of the RXLOS circuits (e.g., 110a) is shown. The circuit 110a generally comprises a block (or circuit) 120, a block (or circuit) 122 and a block (or circuit) 124. The circuit 120 may be implemented as an amplifier circuit. The circuit 122 may be implemented as a rectifier/peak detector circuit. The circuit 124 may be implemented as a comparator circuit. The signal IN is shown broken into differential signal components (e.g., IN(RXP) and IN(RXN)). The circuit 120 may be implemented as a linear amplifier. The circuit 120 may amplify the input signals RXP and RXN to generate a signal VCMS (e.g., an amplified differential AC signal). The rectifier circuit 122 may convert the signal VCMS to DC value (e.g., VPK). The comparator circuit 124 may compare the rectified DC value VPK to a fixed reference (e.g., VREFP). The signal VCMS may also be presented to another input of the comparator 124. The signal VCMS may be compared to a fixed reference (e.g., VREFN). The reference voltages VREFP and VREFN are generally designed to be adjustable in order to support different applications. The reference voltages VREFP and VREFN may be generated by a reference bias circuit (to be described in connection with FIG. 3).

Figure 3:
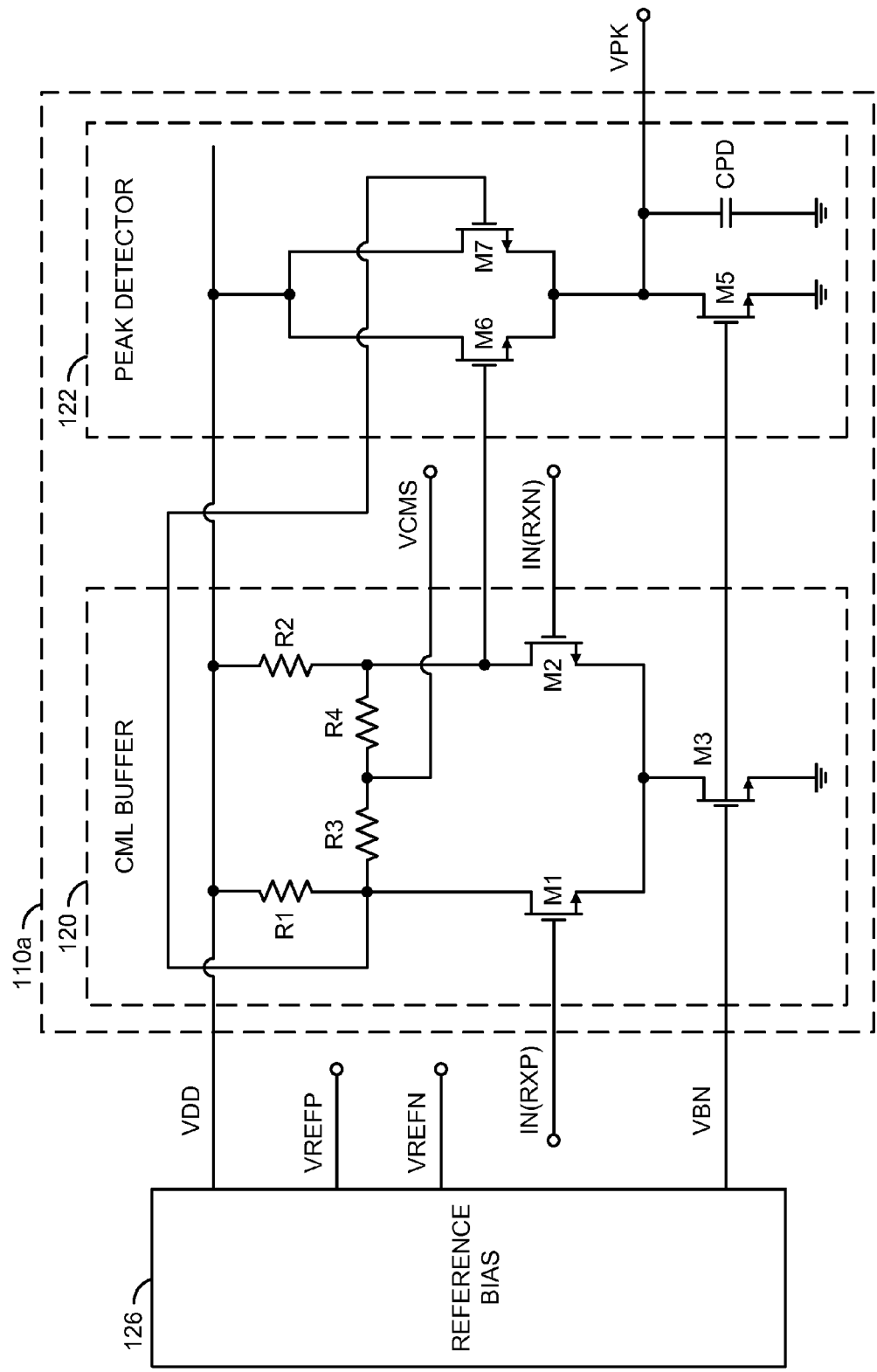
FIG. 3 is a detailed diagram of a CML buffer and peak detector.

Referring to FIG. 3, a detailed diagram of the circuit 110a is shown along with a circuit 126. The circuit 126 may be implemented as a reference bias circuit. The CML buffer circuit 120 generally comprises a resistor R1, a resistor R2, a transistor M1, a transistor M2 and a transistor M3. The peak detector circuit 122 generally comprises a transistor M5, a transistor M6, a transistor M7 and a capacitor CPD. In one example, the transistors M1, M2, M3, M5, M6 and M7 may be implemented as NMOS transistors.

The transistors M6 and M7 may be configured to pass voltages larger than a threshold voltage. The input signals to the gate of the transistors M6 and M7 are normally differential signals. A signal (e.g., VBN) may be presented to the transistor M3 and/or the transistor M5. The signal VBN may be a bias voltage received from the reference bias circuit 126. In half of the signal period, the input to the gate of the transistor M7 is high and the input to the gate of the transistor M6 is low. Therefore, in the first half of the signal period, the transistor M6 is normally on, but the transistor M7 is normally off. In another half period, the transistor M6 would normally be turned off and the transistor M7 would normally be turned on. In order to detect the envelope of the input signal, which may operate similar to an AM demodulator after rectification, an RC low pass filter may be applied to detect the signal envelope. The transistor M5 and the capacitor CPD show one example of how to implement such an RC low pass filter. The corner frequency of the RC filter may be set based on the designed frequency range. For example, to implement a range of 100 Mbps to 4 Gbps, the capacitor CPD may have a value of 4 pF. To implement a range of 3 Gbps to BBbps, the capacitor CPD may have a value of 2 pF. To implement a range of above 8 Gbps, the capacitor CPD may have a value of 1 pF. However, the particular value of the capacitor CPD may be varied for each of the circuits 110a-110n to meet the design criteria of a particular implementation.

A poly resistor and/or poly current may be applied to the amplifier 120 (to be described in more detail in connection with FIG. 4). An output common mode voltage is normally affected by supply variation. The variation of output common mode voltage may directly affect the rectified DC voltage VCMS. In order to reduce the negative impact of the output common mode voltage, the output common mode voltage is subtracted from the VPK.

Figure 4:
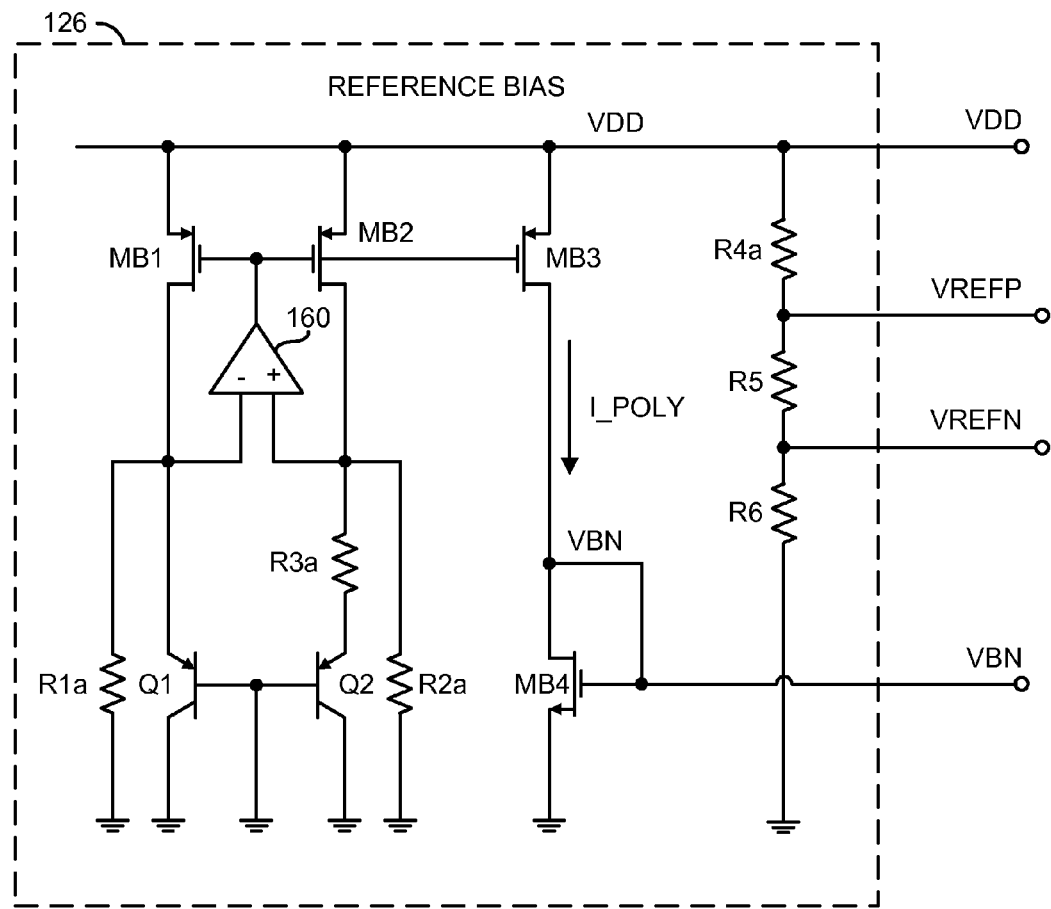
FIG. 4 is a circuit diagram of a reference bias circuit.

Referring to FIG. 4, a more detailed diagram of the reference bias circuit 126 is shown. The reference bias circuit 126 is shown comprising a transistor MB1, a transistor MB2, a transistor MB3, an amplifier 160, a transistor MB4, a resistor R1a, a resistor R2a, a resistor R3a, a resistor R4a, a resistor R5, a resistor R6a transistor Q1 and a transistor Q2. The resistor R4a, R5 and R6 form a divider network used to generate the signal VREFP and/or VREFN. The resistors R1a, R2a, R3a, R4a, R5 and/or R6 may be implemented as poly resistors. A poly current (e.g., I_POLY), which is equal to the ratio of a constant bandgap voltage and poly resistors flowing through MB3 and MB4, is generated from the reference bias block.

Figure 5:
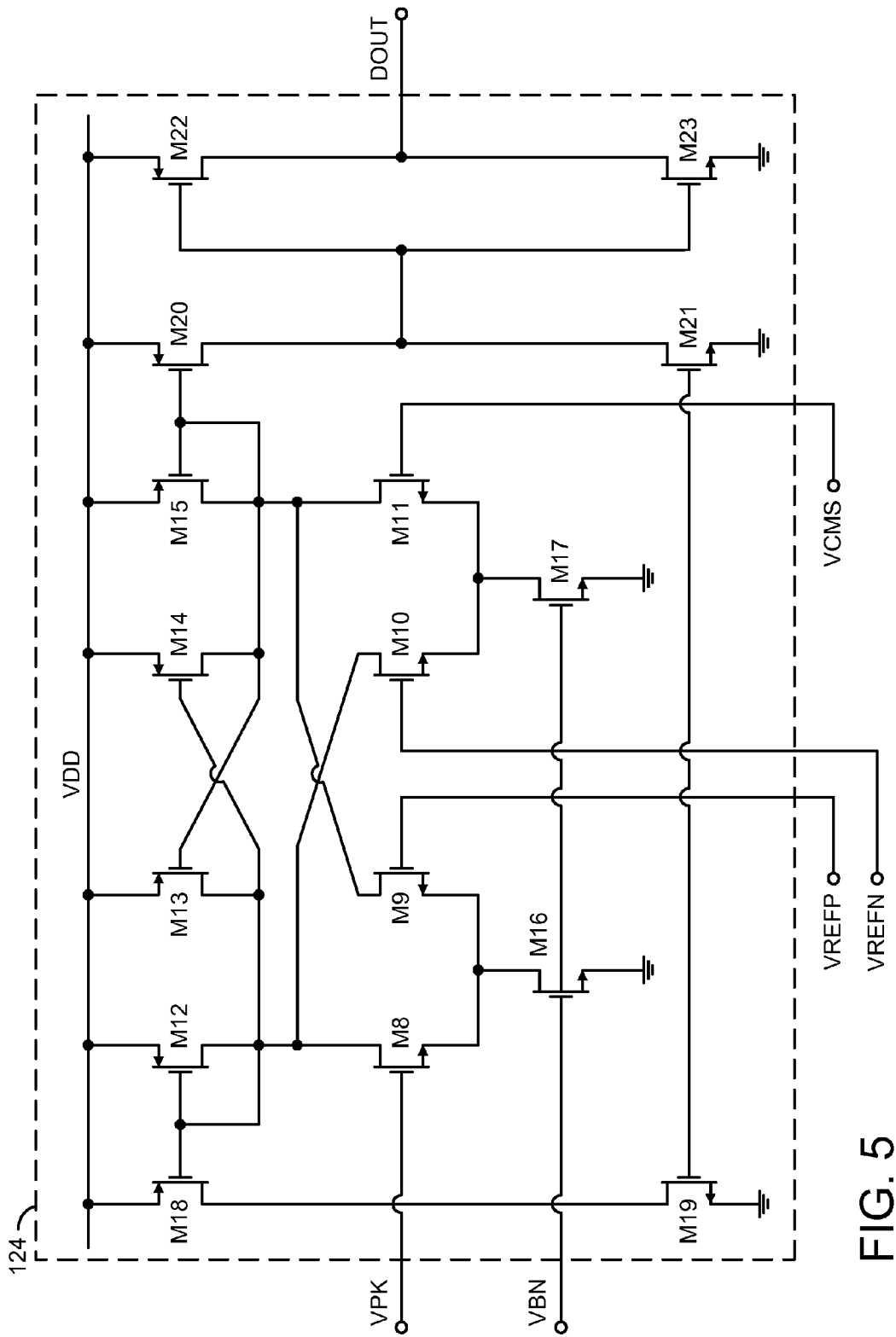
FIG. 5 is a diagram of a comparator with boosted gain.

Referring to FIG. 5, the circuit 124 generally comprises a number of transistors M8-M23. As shown in FIG. 4, to track the supply voltage variation, the input reference VREFP and VREFN are generated by a resistive divider. In an example implementation, a four input comparator is shown. The transistors M13 and M14 may be cross-coupled to provide a negative impedance that may cancel the relatively small positive impedance from the transistors M12 and/or M15 to boost the DC gain of the comparator circuit 124.

Figure 6:
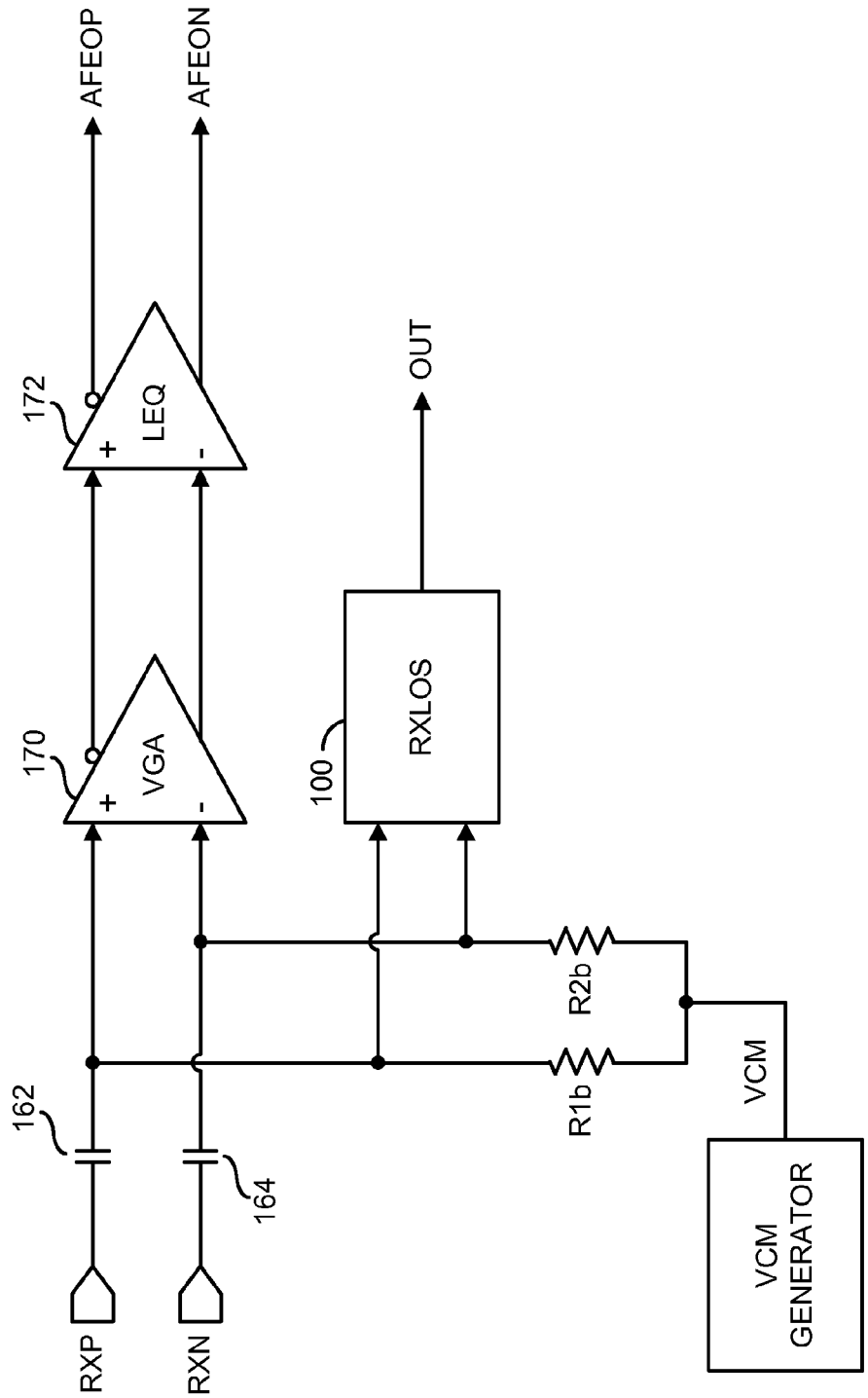
FIG. 6 is a block diagram of a receive front end.

Referring to FIG. 6, a receiver front end illustrating a differential signal received by the circuit 100 is shown. The signals RXP and/or RXN may be AC coupled (e.g., through a capacitor 162 and/or 164) to the circuit 100 and/or to a circuit 170, and/or a circuit 172. A common mode voltage in the signal RX may be generated after the AC coupling capacitor so that the following circuits are able to further process this received signal. In a high speed SERDES architecture, the signals after AC coupling capacitors 162 and/or 164 may be sent to voltage controlled amplifier (VGA) 172 and the RXLOS circuit 100 in parallel.

As described in connection with FIG. 1, the circuit 100 may implement multiple individual RXLOS blocks 110a-110n in parallel. For each of the individual RXLOS block 110a-110n, parameters may be optimized to implement certain desired frequency ranges. An ultra-wide bandwidth operation may be achieved without much tuning and/or without large power consumption.

For each RXLOS block (as shown in FIG. 3) the AC coupled differential signals are shown being sent to the differential pair of NMOS transistors M1 and M2. The transistors M3 and M5 may provide the necessary bias current. The transistors M1 and M2 and the resistors R1 and R2 may implement an amplifier (or CML buffer) to linearly amplify the received signal. In order to maintain a constant output common mode voltage, the bias current VBN is specially designed (e.g., using the poly current I_POLY), which may be generated from bandgap core and may be equal to the ratio of a constant bandgap voltage and poly resistor. The poly resistors R1 and R2 may be used as the load of the amplifier. A product of a value of the poly resistor and the poly current I_POLY may be implemented to be constant over process, voltage and temperature (PVT) variations, which would secure the stability of output common mode voltage.

The circuit 100 divides a large frequency range (e.g., from 100 Mbps to 30 Gbps) into multiple smaller frequency ranges. Each smaller range has a narrower frequency band than the overall operating range. The amplifier 120 may be optimized to have a relatively flat gain response. The detection errors due to gain variation may be minimized.

The amplified signals may be differential signals and may have a high speed signal swing. In order to rectify the output signals, a diode and/or a RC low pass filter are generally applied. Due to the low supply voltage (e.g., 0.95V nominal) and standard CMOS technology, a current CMOS rectifier may be used to convert the differential high speed AC signals to low speed DC signals. The DC signal may then be sent to a low speed comparator.

Figure 7:
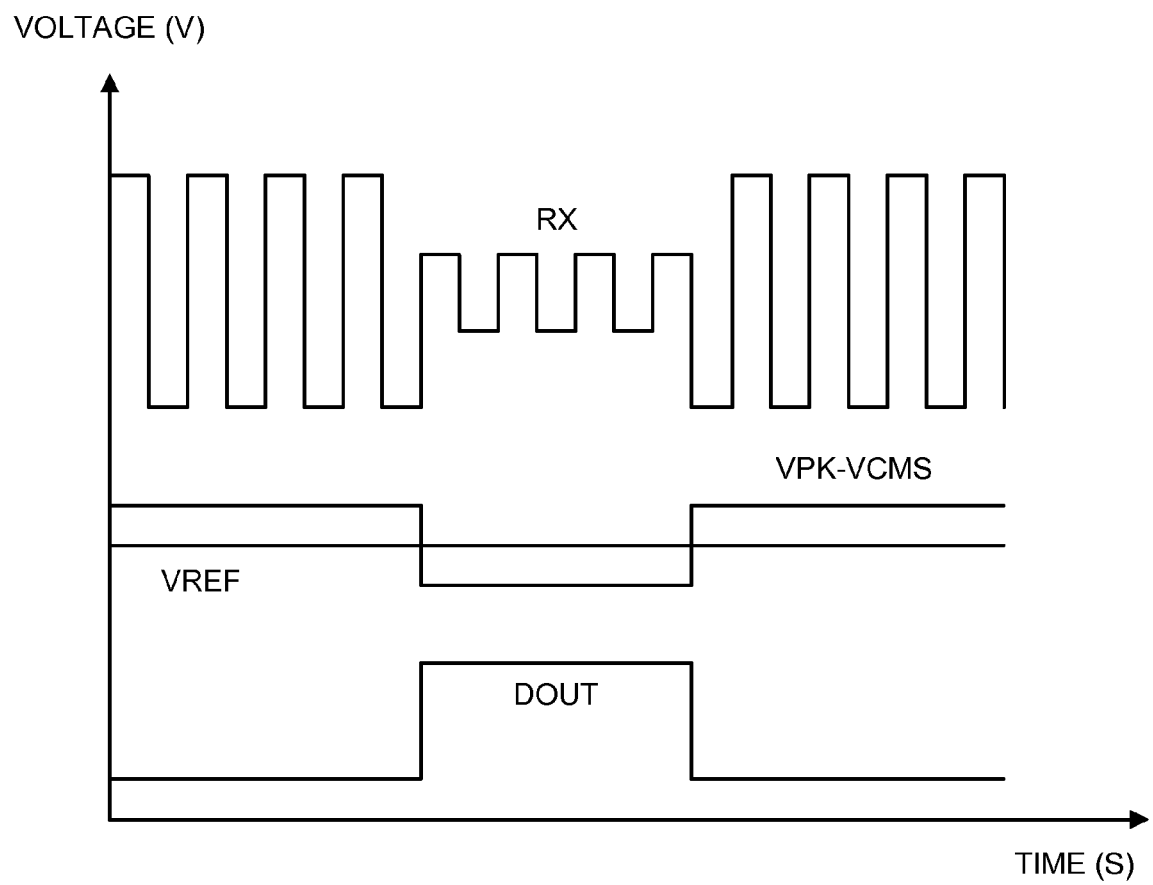
FIG. 7 is a waveform diagram of various signals of the present invention.

Referring to FIG. 7, a waveform illustrating an example illustration of one of the RXLOS circuits 110a-110n is shown. The signal RX is shown as an AC coupled square wave. The signal DOUT is shown as being set high when the input amplitude is smaller than a certain threshold, which is generally called loss of signal. The signal DOUT is set to be low when the input amplitude is larger than the predetermined target threshold. The signal VPK_VCMS may be a rectified and/or low pass filtered signal. When the input amplitude is high, the voltage VPK_VCMS is DC high. When the input amplitude is low, the voltage VPK_VCMS is DC low. The reference voltage does not change with the input amplitude, which is set to be a standard to evaluate the amplitude of the rectified signal.

If the RXLOS circuit 110a is optimized for a frequency range from 10 Gbps to 30 Gbps, the RXLOS circuit 110b is optimized for a frequency range from 2 Gbps to 10 Gbps and the RXLOS circuit 110n is optimized for a frequency range from 100 Mbps to 2 Gbps, the overall circuit 100 may be set to meet the frequency range from 100 Mbsp to 30 Gbps. The overall digital output signal OUT may be derived from the individual RXLOS digital outputs DOUT1-Doutn. The combinational logic 112 may be implemented by a CMOS AND gate.

An example truth table for digital output of the circuit 100 is shown as the following TABLE 1:

TABLE 1

| RXLOS1 | RXLOS2 | RXLOS3 | RXLOS Total |
|--------|--------|--------|-------------|
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 0 |
| 1 | 1 | 0 | 0 |
| 1 | 1 | 1 | 1 |

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more integrated circuits, one or more chips or die arranged as flip-chip modules and/or multi-chip modules or by interconnecting an appropriate network of conventional component circuits, as is described herein, modifications of which will be readily apparent to those skilled in the art(s).

While the invention has been particularly shown and described with reference to the preferred embodiments thereof, it will be understood by those skilled in the art that various changes in form and details may be made without departing from the scope of the invention.

The invention claimed is:

1. An apparatus comprising;
   a first loss of signal circuit configured to (i) receive an input signal containing a series of data and (ii) generate a first indication signal when said input signal is operating within a first frequency range, wherein said first loss of signal circuit is calibrated to detect activity on said input signal within said first frequency range;
   a second loss of signal circuit configured to (i) receive said input signal and (ii) generate a second indication siyual when said input signal is operating within a second frequency range, wherein said second loss of signal circuit is calibrated to detect activity on said input signal within said second frequency range; and
   a gate circuit configured to generate an output signal in response to either said first indication signal or said second indication signal being active.

2. The apparatus according to claim 1, wherein said first frequency range is different than said second frequency range.

3. The apparatus according to claim 1, wherein said apparatus further comprises a plurality of loss signal circuits each configured to (i) receive said input signal and (ii) generate a plurality of indication signals, wherein said input signal is operating within one of a plurality of predetermined frequency ranges.

4. The apparatus according to claim 1, wherein said first loss circuit includes an RC network.

5. The apparatus according to claim 4, wherein said first frequency range is calibrated based on values of said RC network.

6. The apparatus according to claim 1, wherein said apparatus minimizes power consumption.

7. The apparatus according to claim 1, wherein said apparatus is implemented on an integrated circuit.

8. The apparatus according to claim 1, wherein said apparatus is implemented in a serial/deserial circuit.

9. The apparatus according to claim 1, wherein said first and second loss of signal detection circuits generate said first indication signal and said second indication signal by converting said input signal to a DC voltage, then comparing said DC voltage to a reference voltage.

10. The apparatus according to claim 9, wherein said reference voltage is calibrated for a target frequency range.

11. A method for detecting a wideband signal, comprising the steps of:
    (A) receiving an input signal containing a series of data;
    (B) generating a first indication signal when said input signal is operating within a first frequency range, wherein step (B) is calibrated to detect activity on said input signal within said first frequency range;
    (C) generating a second indication signal when said input signal is operating within a second frequency range, wherein step (C) is calibrated to detect activity on said input signal within said second frequency range; and
    (D) generating an output signal in response to either said first indication signal or said second indication signal being active.

12. The method according to claim 11, wherein said first frequency range is different than said second frequency range.

13. The method according to claim 11, wherein said method further comprises a plurality of loss signal circuits each configured to (i) receive said input signal and (ii) generate a plurality of indication signals, wherein said input signal is operating within one of a plurality of predetermined frequency ranges.

14. The method according to claim 11, wherein step (A) includes an RC network.

15. The method according to claim 14, wherein said first frequency range is calibrated based on values of said RC network.

16. The method according to claim 11, wherein said method minimizes power consumption.

17. The method according to claim 11, wherein said method is implemented on an integrated circuit.

18. An apparatus comprising:
    means for (i) receiving an input signal containing a series of data and (ii) generating a first indication signal when said input signal is operating within a first frequency range, wherein said means for generating said first indication signal is calibrated to detect activity on said input signal within said first frequency range;
    means for (i) receiving said input signal and (ii) generating a second indication signal when said input signal is operating within a second frequency range, wherein said means for generating said second indication signal is calibrated to detect activity on said input signal within said second frequency range; and
    means for generating an output signal in response to either said first indication signal or said second indication signal being active.

19. The apparatus according to claim 18, wherein said first frequency range is different than said second frequency range.

20. The apparatus according to claim 18, wherein said apparatus includes an RC network configured to provide said calibration.

* * * * *